(12) United States Patent
Matthews

(10) Patent No.: US 11,589,399 B2
(45) Date of Patent: *Feb. 21, 2023

(54) AUTOMATION OF NETWORKING A GROUP OF MACHINES

(71) Applicant: AGCO Corporation, Duluth, GA (US)

(72) Inventor: Paul Ross Matthews, Dietmannsried (DE)

(73) Assignee: AGCO Corporation, Duluth, GA (US)

( * ) Notice: Subject to any disclaimer, the term of this patent is extended or adjusted under 35 U.S.C. 154(b) by 534 days.

This patent is subject to a terminal disclaimer.

(21) Appl. No.: 16/266,521

(22) Filed: Feb. 4, 2019

(65) Prior Publication Data
US 2019/0174560 A1    Jun. 6, 2019

Related U.S. Application Data

(63) Continuation of application No. 14/904,248, filed as application No. PCT/US2014/046228 on Jul. 10, 2014, now Pat. No. 10,201,022.

(60) Provisional application No. 61/917,557, filed on Dec. 18, 2013.

(51) Int. Cl.
| | |
|---|---|
| H04W 80/00 | (2009.01) |
| H04W 76/10 | (2018.01) |
| A01B 69/04 | (2006.01) |
| A01B 79/00 | (2006.01) |
| G05D 1/00 | (2006.01) |
| G05D 1/02 | (2020.01) |
| H04L 67/12 | (2022.01) |
| H04W 72/00 | (2023.01) |

(52) U.S. Cl.
CPC ......... *H04W 76/10* (2018.02); *A01B 69/008* (2013.01); *A01B 79/005* (2013.01); *G05D 1/0022* (2013.01); *G05D 1/0219* (2013.01); *G05D 1/0287* (2013.01); *H04L 67/12* (2013.01); *H04W 72/005* (2013.01)

(58) Field of Classification Search
None
See application file for complete search history.

(56) References Cited

U.S. PATENT DOCUMENTS

| | | | | |
|---|---|---|---|---|
| 6,128,574 A | * | 10/2000 | Diekhans | G05D 1/0278 701/410 |
| 6,199,000 B1 | * | 3/2001 | Keller | A01B 79/005 342/357.62 |
| 6,549,852 B2 | * | 4/2003 | Hanson | G06Q 40/08 705/4 |
| 7,245,999 B2 | * | 7/2007 | Dietsch | G05D 1/0297 701/50 |
| 8,046,139 B2 | * | 10/2011 | Diekhans | A01B 69/008 701/50 |
| 9,188,982 B2 | * | 11/2015 | Thomson | G05D 1/0274 |
| 9,904,963 B2 | * | 2/2018 | Rupp | A01B 79/005 |
| 9,915,952 B2 | * | 3/2018 | Dollinger | G05D 1/0276 |
| 2002/0198654 A1 | * | 12/2002 | Lange | A01B 69/008 701/50 |
| 2003/0187560 A1 | * | 10/2003 | Keller | A01C 21/005 701/50 |

(Continued)

*Primary Examiner* — Jonathan M Dager

(57) ABSTRACT

A method including entering, by machine, a first field defined by first field boundaries; and automatically associating the machine with a first wireless network defined by the first field boundaries, the first wireless network comprising a secured data communications network.

16 Claims, 8 Drawing Sheets

(56) References Cited

U.S. PATENT DOCUMENTS

| | | | |
|---|---|---|---|
| 2006/0047377 A1* | 3/2006 | Ferguson | G05D 1/0297 701/2 |
| 2006/0200294 A1* | 9/2006 | Scheufler | A01B 79/005 701/41 |
| 2007/0299947 A1* | 12/2007 | El-Damhougy | H04B 7/2606 709/223 |
| 2008/0167774 A1* | 7/2008 | Patel | G08G 1/20 701/1 |
| 2008/0235509 A1* | 9/2008 | Laberteaux | H04W 4/80 713/156 |
| 2009/0234859 A1* | 9/2009 | Grigsby | G08G 1/161 |
| 2009/0312919 A1* | 12/2009 | Foster | A01B 79/005 701/50 |
| 2010/0036696 A1* | 2/2010 | Lang | A01B 79/005 702/182 |
| 2010/0042297 A1* | 2/2010 | Foster | H04L 63/08 701/50 |
| 2010/0094481 A1* | 4/2010 | Anderson | A01D 34/008 701/1 |
| 2011/0112730 A1* | 5/2011 | Rekow | G05D 1/0219 701/50 |
| 2011/0160994 A1* | 6/2011 | Schmidt | A01B 79/005 707/740 |
| 2013/0046525 A1* | 2/2013 | Ali | A01B 79/005 703/6 |
| 2013/0158772 A1* | 6/2013 | Swenson | B60R 1/002 701/25 |
| 2013/0173321 A1* | 7/2013 | Johnson | G06Q 10/06 705/7.12 |
| 2013/0174040 A1* | 7/2013 | Johnson | G06Q 10/06 715/733 |
| 2013/0235758 A1* | 9/2013 | Delmas | H04B 7/2606 370/254 |
| 2013/0342368 A1* | 12/2013 | Nathanson | H04L 69/22 340/903 |
| 2014/0351411 A1* | 11/2014 | Woods | H04W 4/021 709/224 |
| 2015/0331423 A1* | 11/2015 | Volger | A01B 69/008 701/25 |
| 2016/0026940 A1* | 1/2016 | Johnson | A01D 91/00 705/7.11 |
| 2016/0029545 A1* | 2/2016 | Matthews | G06T 7/60 701/28 |
| 2016/0071410 A1* | 3/2016 | Rupp | H04W 4/70 701/50 |
| 2016/0091898 A1* | 3/2016 | Booher | G05D 1/0221 701/26 |
| 2016/0157422 A1* | 6/2016 | Köhler | A01G 25/09 700/275 |
| 2016/0232621 A1* | 8/2016 | Ethington | G06Q 50/02 |
| 2016/0306362 A1* | 10/2016 | Pickett | G05D 1/0287 |
| 2017/0223888 A1* | 8/2017 | Matthews | A01B 69/008 |

* cited by examiner

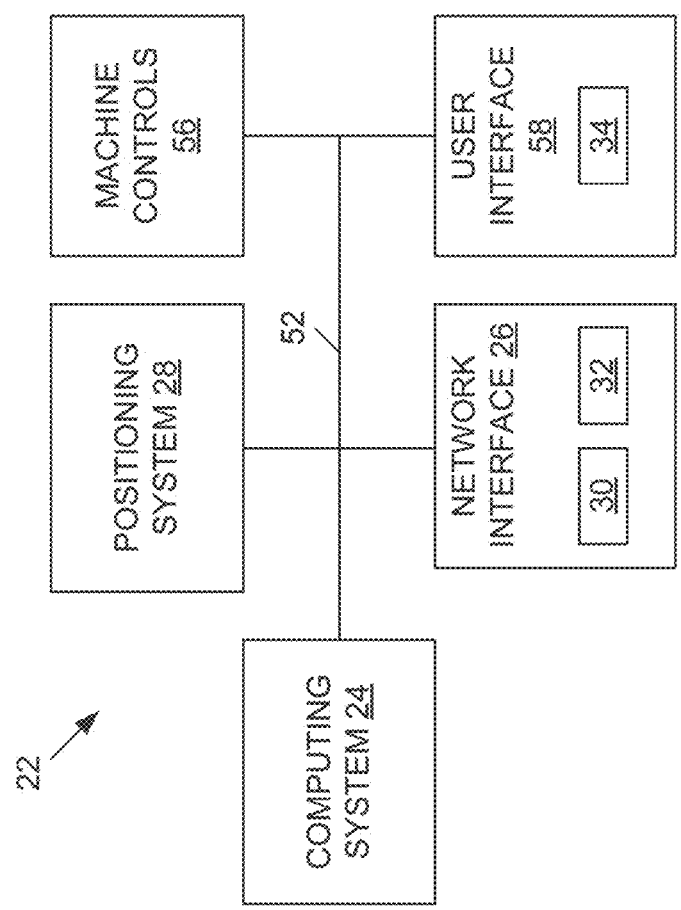

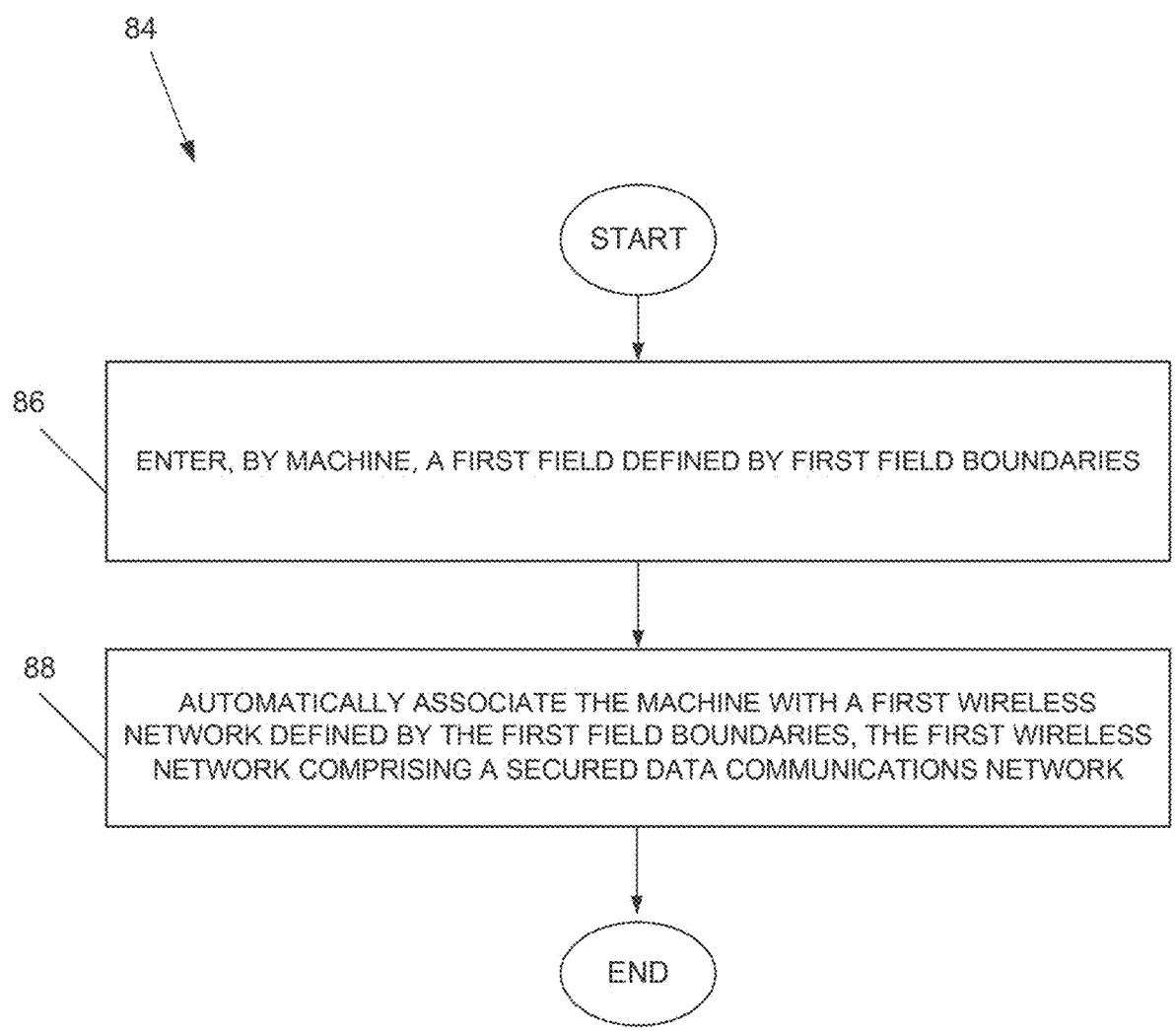

AUTOMATION OF NETWORKING A GROUP OF MACHINES

CROSS REFERENCE TO RELATED APPLICATION

This application is a continuation application of U.S. application Ser. No. 14/904,248, filed Jan. 11, 2016, now U.S. Pat. No. 10,201,022, which application claims the benefit of U.S. Provisional Application No. 61/917,557, filed Dec. 18, 2018, which are hereby incorporated by reference in their entirety.

BACKGROUND

Field of the Invention

The present disclosure is generally related to agriculture technology, and, more particularly, computer-assisted farming.

Description of Related Art

Recent efforts have been made to automate or semi-automate farming operations. Such efforts serve not only to reduce operating costs but also improve working conditions on operators and reduce operator error, enabling gains in operational efficiency and yield.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6A is a block diagram that illustrates an embodiment of an example control system implemented in an embodiment of an auto-networking system.

FIG. 7 is a flow diagram that illustrates an embodiment of an example auto-networking method.

DESCRIPTION OF EXAMPLE EMBODIMENTS

Overview

Figure 1:
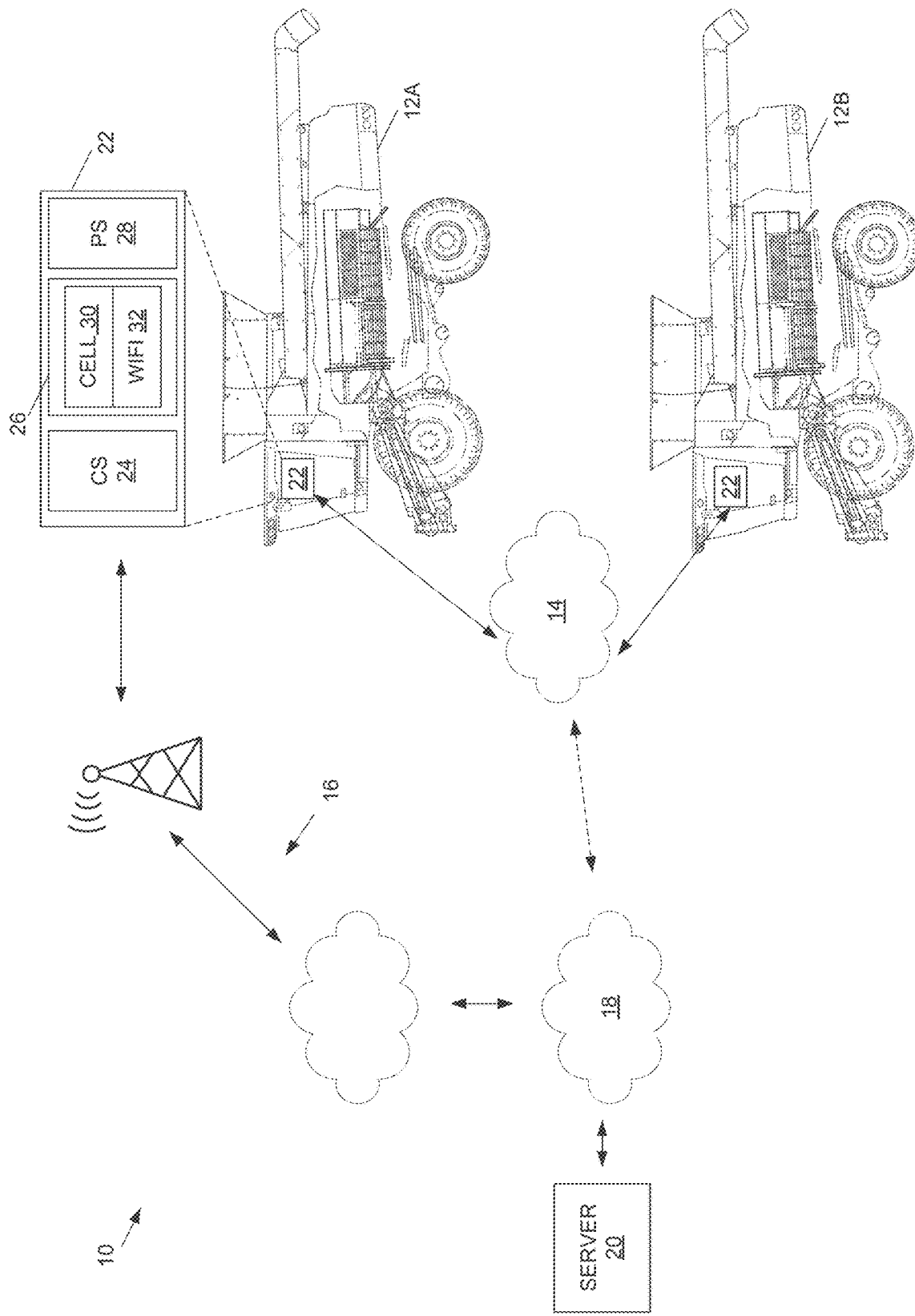
FIG. 1 is a schematic diagram that illustrates an example network topology for an embodiment of an auto-networking system.

In one embodiment, a method comprising entering, by machine, a first field defined by first field boundaries; and automatically associating the machine with a first wireless network defined by the first field boundaries, the first wireless network comprising a secured data communications network.

Detailed Description

Certain embodiments of an auto-networking system and method are disclosed that utilize field boundaries as a geofence that serves in an automatic way of knowing that machines belong to the same group, enabling the sharing of information (e.g., operational parameters and other data) without requiring cumbersome manual processes involving manual entry of network names and/or passwords. In one embodiment, an auto-networking method may be fully automatic. For instance, a machine (e.g., an agricultural machine, support machine, such as a grain truck) may enter a field and automatically, upon detection of entry onto the field, becomes part of (associates with) a field network (e.g., a wireless network), even when working alone (e.g., the only machine in the field). Another machine (e.g., agricultural machine, support machine, etc.) may enter the same field, and upon detection of entry onto the field, automatically associates with the same field network. By joining to the same network, the machines may share information, such as operational parameters, with each other, including a wayline for each machine, current load, fuel status, up-to-date worked field history (e.g., area covered by dispensed chemicals, grain harvested, etc.), among other operational parameters. In some embodiments, all or a portion of the shared information may be displayed on respective display screens (e.g., cab monitors, headsets, etc.) of each machine.

Digressing briefly, with an increase in the presence of technology in farming operations, there exists a greater need for machines to collaborate on the same farming operation (e.g., combine harvesting operations, though other operations in farming are contemplated). For instance, today's machines participating in such collaborative groups still act mostly as individual machines with limited manual sharing of data. Most current systems do not share real-time data while the operation is ongoing. At best, sharing of data files is implemented manually using detachable storage devices, such as USB sticks, SD cards, etc., to ensure, for instance, coordinated operations along a given wayline for guidance. As radio technology has advanced, there exists methods now that allow machines to communicate with each other to permit more collaborative operations (including data sharing). For instance, in cases where there has been sharing of data (e.g., logging onto a password protected base station for guidance corrections), a manually-intensive process is involved, such as naming the network and/or entry of passwords, which must not only be shared amongst all of the machines, but which represents a nuisance to manage and/or change whilst offering questionable security. To address these and/or other deficiencies in the current state of the art, certain embodiments of an auto-networking system delineate machines in the same field as being related (e.g., they are performing the same operation and/or working towards fulfilling the goal of operations in a given field), enabling the machines to be automatically associated within the same field network without the need for passwords and/or other conventional identification methods used to group machines in a network. In a sense, certain embodiments of auto-networking systems achieve an ad hoc network of machines that enable the sharing of information to the exclusion of all other machines outside of the network (e.g., in another, adjacent field grouped according to another field network).

Having summarized certain features of auto-networking systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on an agricultural machine embodied as a combine harvester, though it should be appreciated that some embodiments of auto-networking systems may use other agricultural machines (e.g., planters, sprayers, foragers, windrowers, including support machines, such as truck and trailer combinations), towed or self-propelled, and/or machines from other industries that can benefit from collaboration over a network with other machines to achieve the goals of a given field operation, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set forth in the description.

Note that references hereinafter made to certain directions, such as, for example, "front", "rear", "left" and "right", are made as viewed from the rear of the combine harvester (or generally, machine) looking forwardly.

Referring now to FIG. 1, shown is a schematic diagram that illustrates an example network topology for an embodiment of an auto-networking system 10. In one embodiment, the auto-networking system 10 comprises one or more machines 12 (e.g., two (2) shown in FIGS. 1, 12A and 12B, though other quantities of the same or different machines and/or configurations may be used in some embodiments), a local wireless network 14, a cellular network 16, a wide area network 18 (e.g., Internet) that is coupled to the cellular network 16 and optionally to the wireless network 14, and a server device 20 coupled to the wide area network 18. In the example of FIG. 1, the machines 12A and 12B are co-located in the same field. It is noted that the combine harvesters 12 are shown in FIG. 1 without the attached header for purposes of brevity, with the understanding that one of a plurality of different types of headers may be used with each of the combine harvesters 12. Further, it should be appreciated by one having ordinary skill in the art that other equipment used to facilitate wireless and/or cellular functionality, such as switches, routers, gateways, a mobile core, DSLAM, central office, and/or ISP facilities, etc., may be deployed in certain embodiments of an auto-networking system 10, though not shown to avoid obfuscating relevant features of the present disclosure. In other words, it should be appreciated within the context of the present disclosure that some embodiments of an auto-networking system 10 may include additional components, fewer components, or different components. For instance, communication may be achieved, at least in part, via the use of a satellite system in some embodiments, and hence communications are not limited to entirely terrestrial mechanisms. The machines 12 depicted in FIG. 1 are each equipped with a control system 22, though not all machines in some implementations may be similarly equipped. Using the machine 12A in FIG. 1 as a representative example, with similar applicability to the other machine 12B, the control system 22 comprises a computing system (CS) 24, a network interface 26, and a positioning system 28. The computing system 24 provides for the overall command and control of the control system 22. In one embodiment, the network interface 26 comprises a cellular network interface 30 and wireless network interface 32 (e.g., WiLAN, such as based on 802.11), though some embodiments may use only one of these two components. The wireless network interface 32 enables machine-to-machine communications, whereas the cellular network interface 30 enables machine-to-Internet communications. Note that in some embodiments, machine-to-machine connectivity may be achieved via machine-to-Internet-to-machine connections. The positioning system 28 enables a determination of the current geographical location of the machine 12, and in some embodiments, may comprise guidance functionality. In one embodiment, the positioning system 28 comprises a global navigation satellite system (GNSS), such as one or more of a global positioning system (GPS), GLONASS, Galileo, among other constellations. In some embodiments, the positioning system 26 may be embodied as a mobile device (e.g., handheld) that is communicatively coupled to the computing system 24. The server device 20 is configured to store operational parameters of the machines 12, enabling the sharing of all or a portion of the stored operational parameters by one or more machines 12 that traverse multiple fields. The server device 20 may be located remotely from the worked fields, such as at a business (e.g., farm, an Internet Service Provider (ISP) facility, regional or local agricultural machine manufacturer's representative facility, manufacturer's facility, among others), residence, or other locations remote from the field. The server device 20 may host a web-service, or serve as a gateway to one or more other servers in the Internet, and be coupled to the control systems 22 over wireless (and possibly wired) connections. In one example implementation, machines 12 operating in a given field may communicate operational parameters via the network interface 26 to the server device 20. A fleet of support machines, such as grain trucks (e.g., each equipped with all or a portion of the control system 22) servicing the machines 12 of the given field as well as machines from other fields, may access the server device 20 to enable a determination as to which machines 12 are ready for unloading of grain, the determination enabled through analysis of the uploaded operational parameters (e.g., at the server device 20). Note that, though grain trucks are used as an example of support machines, other support machines equipped with all or a portion of the control system 22 may be used, such as fluid-dispensing vehicles that supply fuel for the machines 12, chemicals, etc. Though shown with a single server device 20 in FIG. 1, plural server devices and/or coupled storage devices may be used in some embodiments. Such storage devices may be used to store the operational parameters of the machines 12 in one or more data structures.

Figure 2:
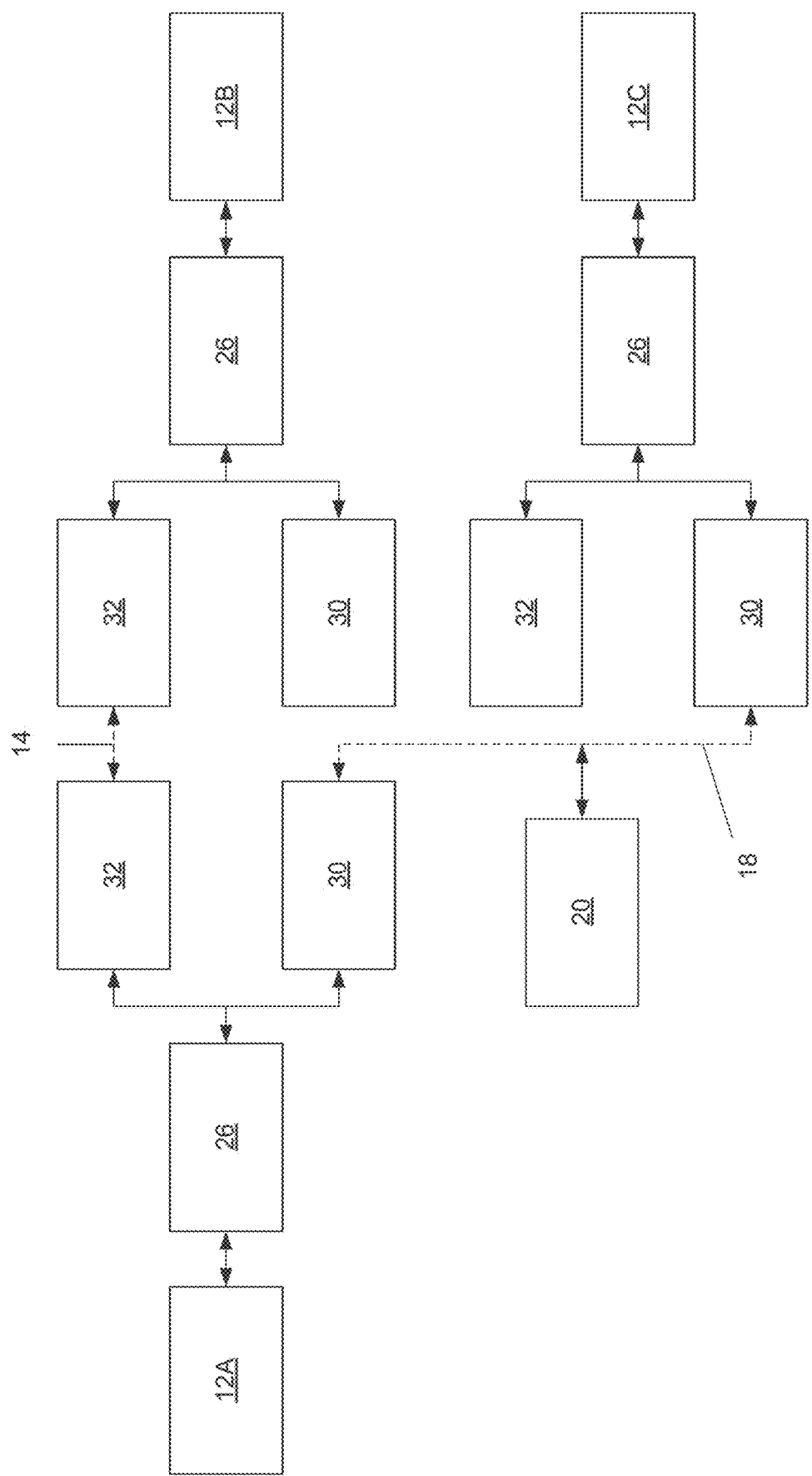
FIG. 2 is a block diagram that illustrates various mechanisms of communication deployed by plural example machines of an embodiment of an auto-networking system.

With continued reference to FIG. 1, attention is directed to FIG. 2, which graphically illustrates machine-to-machine and machine-to-Internet communications as performed by an embodiment of the auto-networking system 10. Each of the machines 12A-12C comprises a communications device embodied as a network interface 26, the network interface comprising the wireless network interface 32 for enabling machine-to-machine and a cellular network interface 30 for enabling cellular/Internet connectivity. In the example depicted in FIG. 2, the machines 12A and 12B are co-located in the same field, and communicate with each other via the respective wireless network interfaces 32 over the local wireless network 14 in ad hoc fashion. Further, the machines 12A and 12C are remotely located relative to one another, and communicate with each other via the cellular network interfaces 30 via the wide area network 18 (and the cellular network 16). For instance, the machine 12A may communicate operational parameters to the server device 20 via networks 16 and 18, and the machine 12C may be embodied as a grain truck (or other support machine) that accesses the server device 20 to determine the current status of the machine 12A (among possibly other machines) based on the stored operational parameters. The operational parameters in this implementation may include such information as the operational status of the machine 12A (e.g., currently harvesting crops), the status of the grain load (e.g., percentage load relative to maximum capacity), and the location of the machine (e.g., in a specified field, at particular GPS coordinates). As another example, the machine 12C may communicate its estimated return time to the field to support machine 12A, the return time which machine 12A may access from the server device 20 to facilitate scheduling of grain unloading. Such examples are merely illustrative, and one having ordinary skill in the art would understand that other implementations may be achieved that are enabled by machine-to-Internet and machine-to-machine communications of the auto-networking system 10.

Figure 3:
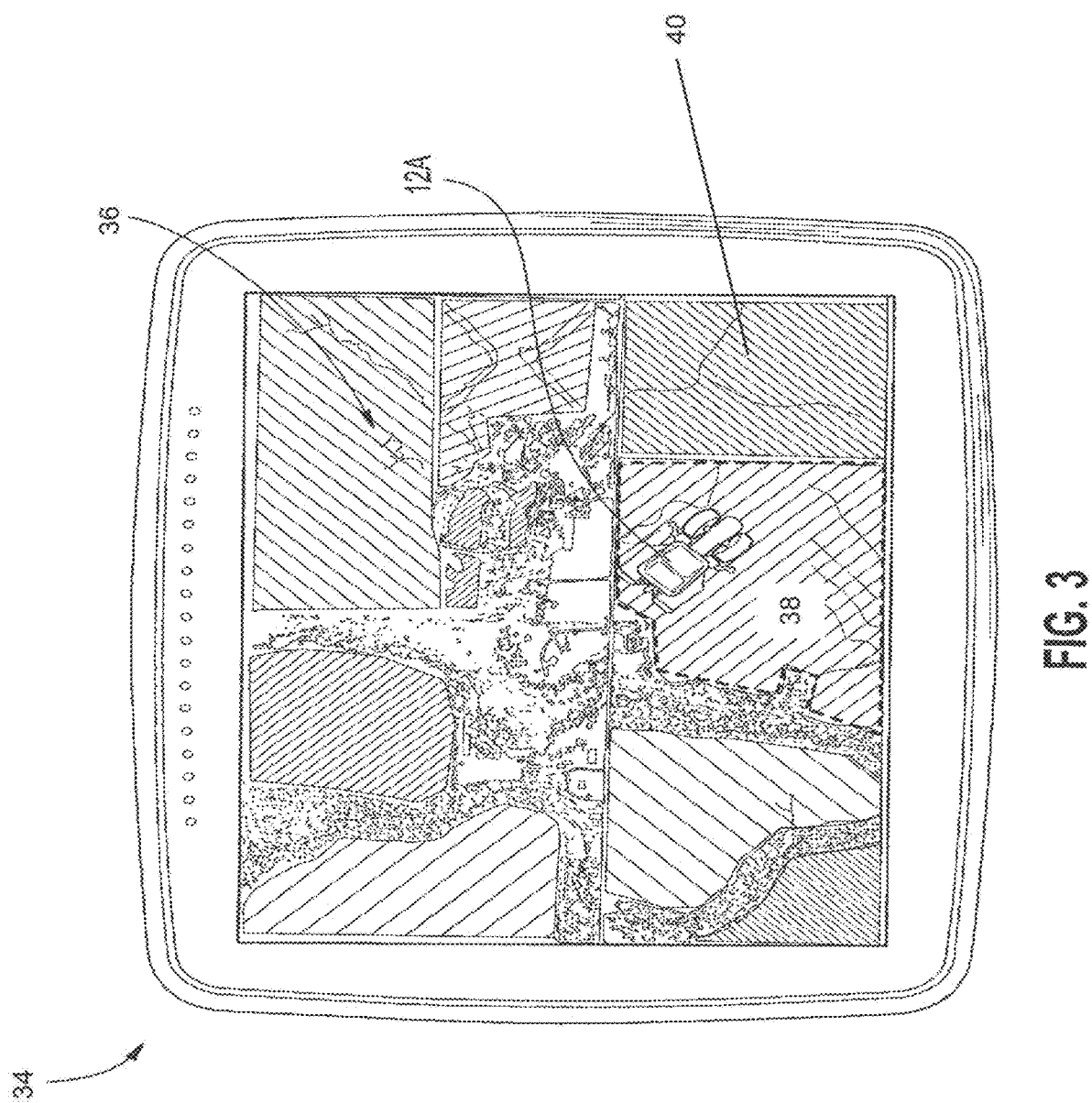
FIG. 3 is a screen diagram that illustrates an example display screen showing boundary determinations by an example machine of an embodiment of an auto-networking system.

In one example operation of an auto-networking system 10, and referring to an implementation initially where there is a single machine involved, such as machine 12A, an operator of the machine 12A may navigate the machine 12A down a road to reach a field. Note that reference to an operator may refer to an operator that is residing in the cab of the machine 12 and manipulating on-board navigational controls. In some embodiments, reference to an operator may refer to an operator that is navigating the machine 12 from a remote location, such as in semi-autonomous farming implementations. In some embodiments, autonomous systems may be used where there is no direct operator influence on machine navigation. Attention is directed to FIG. 3 (with continued reference to FIG. 1), which shows a display screen 34 with a map 36 displayed thereon. The display screen 34 may be part of, or otherwise associated with, one or more of the control systems 22, and in this example, is associated with the control system 22 (e.g., coupled to the computing system 24) of the machine 12A. In some embodiments, the display screen 34 may be disposed on a portable communications device, such as a cell-phone, tablet, laptop, etc.), or be integrated in a virtual headset. As the operator navigates the machine 12A to a field to be farmed (e.g., in the case of combine harvesters, farming generally refers to harvesting crop material as the combine harvester traverses the field, including threshing, separating, and cleaning grain while discharging from the machine 12A material other than grain (MOG) as is known), the computing system 24 presents a top-down map 36 on the display screen 34 for real-time or near real-time observance by the operator (e.g., in the cab, or in some embodiments, at a remote location). In some embodiments, a choice of one or more views (e.g., overhead/or angled, live capture, aerial imagery or a graphical representation of the same, etc.) among a plurality of views may be presented on the display screen 34 as selected by an operator. In some embodiments, a local cache of maps 36 (e.g., geographic coordinates) may be installed in the computing system 24, or in some embodiments, the map 36 may be streamed to the computing system 24 from the server device 20 in real-time or near real-time (e.g., continually, or on a periodic or aperiodic basis). The map 36 comprises plural fields, including fields 38 and 40, and an image of the agricultural machine 12A. In some embodiments, the map (and objects within it) may comprise a snapshot of real aerial imagery, or in some embodiments, a corresponding graphic (e.g., icon or symbol or geometrical objects translated from, and representing, the same), or a mix of each (e.g., a graphic representing the agricultural machine 12A overlaid on a snapshot of the real aerial imagery). Note that the displayed map 36 may be a browser displayed web-page that the operator, residing in the cab of the machine 12A, may enter inputs into, or in some embodiments, a locally-generated graphical user interface (GUI, e.g., non-browser based) that populates the screen with the downloaded map.

The boundaries of the fields are identified by the computing system 24 (or in some embodiments, the server device 20 and communicated to the computing system 24) without operator intervention, though some embodiments may permit operator intervention. As the operator navigates the machine 12A along the road, in close proximity (e.g., within a ten (10) mile radius, for instance) to the fields, the computing system 24 determines the boundaries of each of the fields (e.g., checking locally cached or downloaded maps to current geographical (e.g., GPS) coordinates of the machine 12A), and highlights the boundaries as depicted in FIG. 2 for field 38 with dashed lines along the perimeter of the field 38. In some embodiments, the highlighting feature (e.g., on the display screen 34) may be optional. It should be appreciated that boundaries for the other fields may likewise be highlighted (or in some embodiments, only a field designated in advance for work by the operator), but for facilitating an understanding of the description, the highlighted boundaries are only depicted for the field 38 in the examples that follows. As the machine 12A travels along the road, the computing system 24 updates the map 36 to reflect the movement of the machine 12A, as is known according to various web-based navigators. In some embodiments, the server device 20 located remotely from the field 38 may identify the boundaries and communicate the map 36 and highlighted boundaries to the computing system 24 of the machine 12A. In either case, in at least one embodiment, the identification of the boundaries is done without requiring operator input explicitly requesting or otherwise instructing the computing system 24 to perform this function.

Note that some embodiments enable editing of the identified boundaries. For instance, if the boundaries are to be optimized (e.g., for minor corrections, for joint fields, etc.), the computing system 24 enables operator intervention to edit the boundaries.

In one embodiment, the machine 12A, upon detecting its presence within the confines of the boundaries of the field 38 (or in some embodiments, after a defined threshold of time residing within the boundaries), automatically associates the machine 12A with a wireless network. The computing system 24 may automatically configure an equivalent to a user identification (e.g., service set identification or SSID) and password based on the determined boundaries. For instance, an equivalent to the SSID may be the quantity of sides to the field, and the password equivalent may the total length of the sides. In some embodiments, equivalents based on other measures or calculations may be used, such as an SSID equivalent of the centroid of the field and the password equivalent of the total side lengths. In other words, any manner of uniquely identifying a field network corresponding to the field boundaries may be used, depending on the desired complexity and/or processing power. The machine 12A then automatically broadcasts its operational parameters for communication with other machines 12 in the field. Assuming the machine 12A is the only active machine in the field 38, the association and subsequent broadcast of the operational parameters in effect forms an ad hoc field network for the field 38 (with the machine 12A associated with the field network). The field network is defined by the boundaries of the field 38, as described above in the association process. In some embodiments, additional parameters may be used to define the field. The broadcast signal may be uniquely identified as belonging to the field network according to a programmed protocol, such as via a given bit sequence, frequency, etc. As one or more other machines 12 (not shown) enter the field 38, they also automatically (without operator intervention) associate with the field network by virtue of their presence within the boundaries of the field 38 and a similar association process, and commence broadcasting their respective operational parameters to the other machines 12 (including machine 12A) co-located within the field 38. In addition, the machines 12 within the field 38 automatically receive each other machine's broadcasted operational parameters. The shared information may be presented on the display screen 34 of each machine 12, such that images of all of the machines 12 within the field network (and hence within the field 38) may be presented as well as the current path or trajectory (e.g., wayline if guidance is used) and the progress of the fields already worked (e.g., distinguished via color, pattern, etc. compared to un-worked areas of the field 38). Additional information presented on each display screen 34 (of each machine 12 within the field 38) include other operational parameters, such as grain load, fuel load, alerts (e.g., malfunction of a machine 12), etc. In other words, simply by virtue of entering the field 38, an ad hoc field network is established, with sharing of information among an automatically created group of machines within the boundaries of the field 38. Also, through the sharing of operational parameters, each machine 12 has a picture (e.g., perspective) of the entire work of the field 38 rather than only sub-portions of the field. When all of the machines 12 leave the field, the field network essentially ceases to exist.

Figure 4:
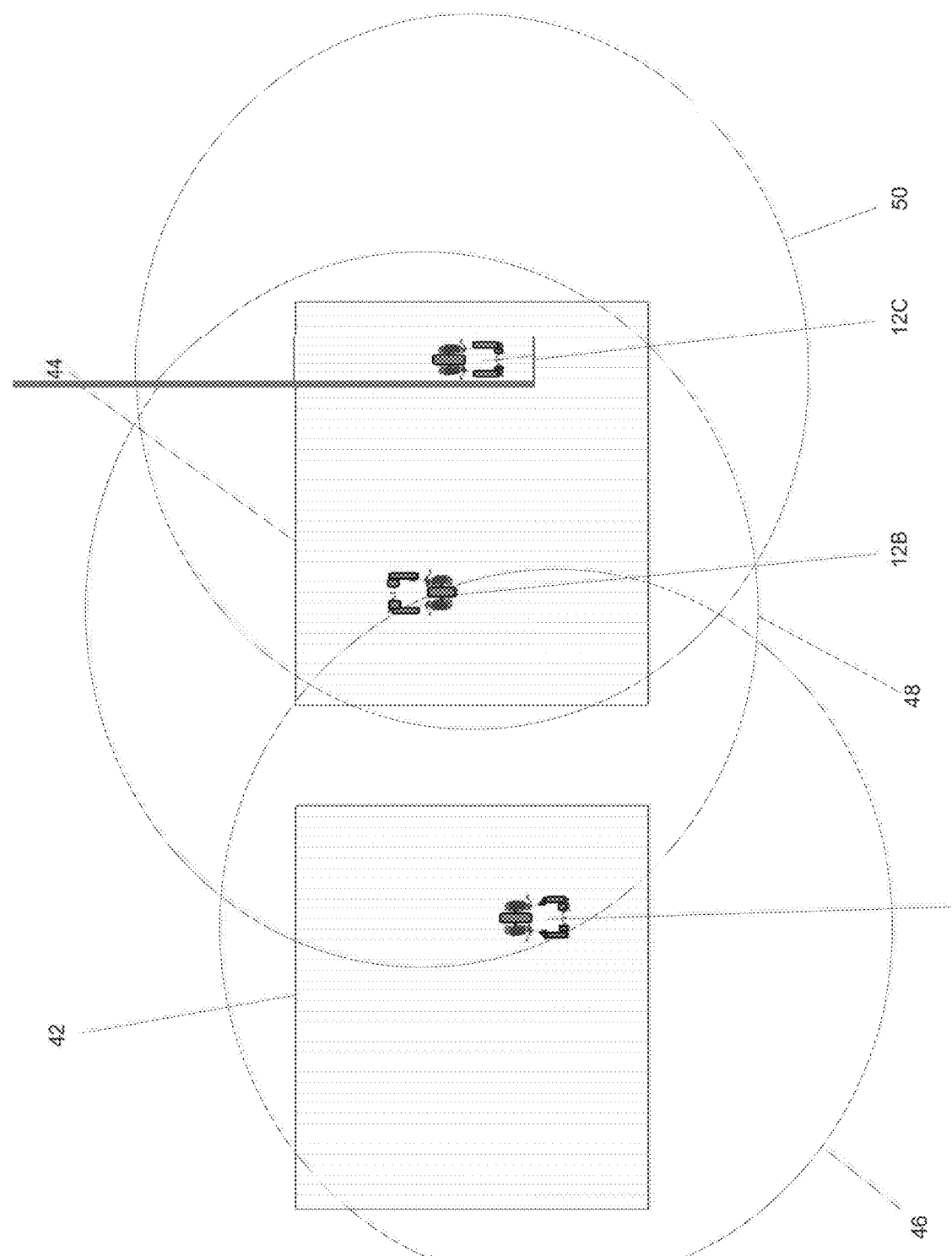
FIG. 4 is a schematic diagram that illustrates overlapping radio ranges of an embodiment of an auto-networking system corresponding to plural machines operating in different fields yet ignoring communications that are not sourced from within a co-located field.

FIG. 4 illustrates example machine operations and overlapping broadcasts among plural machines 12 disposed among plural fields, and in this example, two (2) fields 42 and 44. As shown, the machine 12A is working within the boundaries of the field 42. The machine 12A broadcasts its operational parameters according to radio signal 46. The machine 12A operates within a first field network defined by the boundaries of the field 42, despite the radio signal 46 extending beyond the boundaries. The machines 12B and 12C are working within the boundaries of the field 44. The machines 12B and 12C broadcast their respective operational parameters according to radio signals 48 and 50, respectively. The machines 12B and 12C operate within a second field network defined by the boundaries of the field 44, despite the radio signals 48 and 50 extending beyond the boundaries of the field 44. Despite the overlap in the radio signals 46-50, the first and second field networks do not overlap, and hence communications that are not sourced from within the worked field are ignored by the respective receiving machine 12. For instance, although radio signal 46 sourced from machine 12A is within the range of the machine 12B (and hence received by the machine 12B, enabling awareness of each others presence), the radio signal 46 is ignored by the machine 12B since the machine 12B only communicates with machines co-located within the second field network (e.g., machine 12C co-located within the field 44). Similarly, the machine 12A is within range of the radio signal 48 sourced from the machine 12B, but the machine 12A ignores the radio signal 48 since the machine 12A only communicates with machines located in the first field network. In one embodiment, ignoring of a given radio signal is made possible through the identification of unique identifiers (e.g., packet IDs, user name and/or password of the associated field encoded in the signal, etc.) in the broadcast signal. In some embodiments, the signal delivered by the machine 12 may be a directed (e.g., unicast) signal to another machine 12 detected within the same field. For instance, GPS coordinates may be communicated by one of the machines 12 as an operational parameter, and the receiving machine 12 may compare the coordinates with the boundary coordinates of the field and determine that the sending machine 12 is within the same field and hence within the same field network, enabling a directed signal of operational parameters for shared use.

Figure 5:
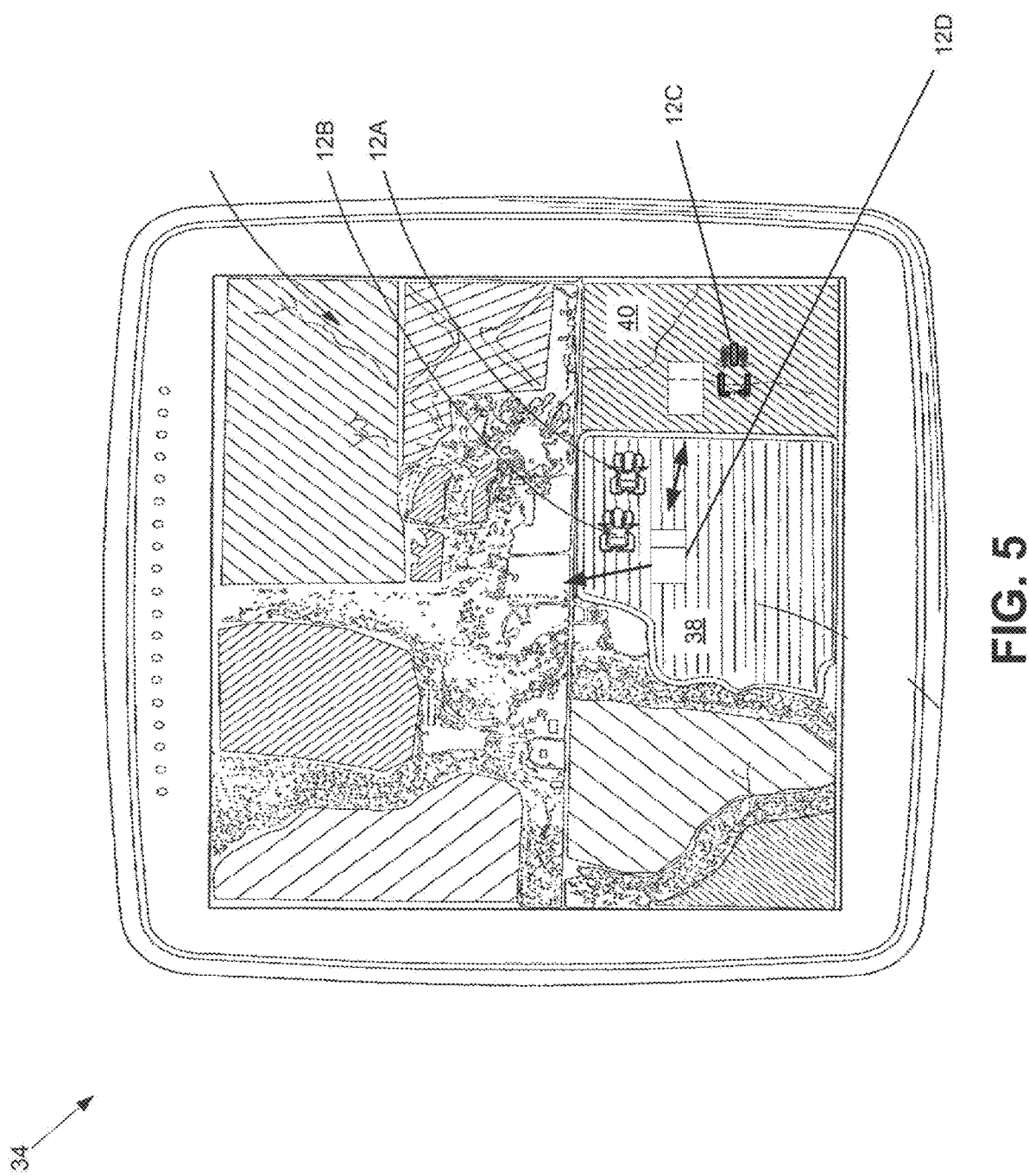
FIG. 5 is a schematic diagram that illustrates an embodiment of an auto-networking system that enables a configured persistence in communications between machines of a given field and a machine with a transitory presence in the field.

Referring now to FIG. 5, shown is an example screen diagram of the display screen 34 to help illustrate certain embodiments where one or more of the machines 12 maintain a persistent connection to a previously established field network and/or concurrently associate with more than one network. In the depicted example, machines 12A and 12B, embodied as combine harvesters, are working in field 38. Machines 12A and 12B are associated with (establish connectivity with) a first field network defined by the boundaries of the field 38, and hence machines 12A and 12B share operational parameters with each other. In another field 40 (in this example, an adjacent field, though not limited to being an adjacent field), the machine 12C embodied as a combine harvester is working the field 40, and is associated with a second field network defined by the boundaries of the field 40. A support machine 12D, embodied as a grain truck, is shown supporting the machines 12A and 12B in the field 38. When the grain truck 12D is fully loaded with harvested grain from the unloading of the combine harvesters 12A and 12B, the grain truck 12D leaves the field 38 to discharge the grain at a grain storage facility located remotely from the field 38. In one embodiment, the grain truck 12D maintains its network association to the first field network when it leaves the field 38. For instance, maintenance of the connection between the grain truck 12D and the combine harvesters 12A and 12B enables the operators of the combine harvesters 12A and 12B to know when the grain truck 12D will return. A continually updated, estimated return icon or data may be presented on the display screen 34 of each of the combine harvesters 12A and 12B, populated with the estimated time of return based on a signal feed from the grain truck 12D. For instance, the grain truck operator may send a text message that is displayed on the screen, or operational parameters of the grain truck 12D (e.g., speed, location, distance from the field 38, distance from the grain storage facility, etc.) may be processed locally (at the grain truck 12D, or at the combine harvesters 12A and 12B, or at the server device 20), and the estimated time of return calculated and presented on the display screen 34. In some embodiments, one of the machines 12A and 12B may prompt the return of the grain truck 12D, such as based on a request signaled to the grain truck 12D from the combine harvester 12A or 12B that support is needed for unloading the respective combine harvester 12A or 212B. Other mechanisms of communicating a need for support and/or an estimated return time or other information may be used, and hence are contemplated to be within the scope of the disclosure. In some embodiments, one or more of the grain truck 12D or combine harvesters 12A, 12B may elect to maintain the persistent connection with the first field network. In some embodiments, the persistence in connectivity may be automatically set for certain types of machines 12, or manually set in some embodiments. In some embodiments, the persistence may be time-constrained (e.g., time-boxed, such as twenty-four (24) hours). The ability of the grain truck 12D to maintain the connection to the first field network is based on the radio technology in use. For instance, with a cellular network interface 30 (e.g., with connectivity to the Internet), longer distance communications (e.g., over ten (10) miles) may be enabled than if maintaining the connection via only a local wireless network connection. Note that for some embodiments, only a subset of the operational parameters may be communicated between the grain truck 12D and the combine harvesters 12A and 12B, such as when bandwidth constraints are a relevant issue.

In some embodiments, one or more of the machines 12 may associate with more than one field network. Using the example depicted in FIG. 5, the grain truck 12D may support machines 12 in multiple fields, such as machines 12A and 12B in the field 38 and the machine 12C in the field 40. The grain truck 12D is shown in phantom in the field 40, signifying along with the dual-headed arrow the transitory presence between fields 38 and 40. Accordingly, in one embodiment, the grain truck 12D maintains an association with the first field network (e.g., defined by the boundaries of the field 38) and the second field network (e.g., defined by the boundaries of the field 40) at the same time. By having multiple persistent connections, just-in-time unloading of the multiple combine harvesters 12A, 12B, and 12C may be achieved, since the grain truck 12D is continually updated of the load status of the combine harvesters 12A-12C. In some embodiments, similar to the persistent connection to a single field network, the association (connectivity) with multiple field networks may be achieved automatically, or in some embodiments, as assigned by a fleet operator from a remote location (e.g., over the Internet).

Though the examples of persistent connectivity for remote participation or participation among multiple field networks has been described in association with grain unloading support, it should be appreciated that such mechanisms may be readily extended to other support vehicles or other machines, such as among multiple combine harvesters to automatically advise of work progress or machine breakdown (e.g., to assist harvesting operations when tasks are completed in another field), or other support machines such as those used for providing fuel, water, servicing, etc.

With continued reference to FIGS. 1 and 5, attention is now directed to FIG. 6A, which illustrates a control system 22 that may be used in an embodiment of an auto-networking system 10 (FIG. 1). It should be appreciated within the context of the present disclosure that some embodiments may include additional components or fewer or different components, and that the example depicted in FIG. 6A is merely illustrative of one embodiment among others. Further, in some embodiments, the same or similar architecture depicted in FIG. 6A may be used in each machine 12 (e.g., 12A-12D, FIG. 5), or in some embodiments, only a subset (e.g., without the cellular network interface 30). The control system 22 comprises the computing system 24. The computing system 24 is coupled in a network 52 (e.g., a CAN network or other network, and not limited to a single network) to a positioning system 28 (e.g., GNSS receiver, which may include the ability to access one or more constellations jointly or separately), machine controls 56, a user interface 58 (which in one embodiment includes the display screen 34), and the network interface 26, which comprises the cellular network interface 30 and the wireless network interface 32. In some embodiments, functionality of the network interface 26 may be embedded in (or directly coupled to) the computing system 24. The machine controls 56 collectively comprise the various actuators, sensors, and/or subsystems residing on the machine 12, including those used to control machine navigation (e.g., speed, direction (such as a steering system), etc.), implement (e.g., header or trailer) position, and/or control, internal processes, among others. The user interface 58 may be a keyboard, mouse, microphone, touch-type (or other type of) display device, joystick, steering wheel, or other devices (e.g., switches) that enable input by an operator and also enable monitoring of machine operations. As noted above, the display screen 34 may be a component of the user interface 58. The positioning system 28, as is known, may include guidance functionality to enable autonomous or semi-autonomous operation of the machine 12 in cooperation with the machine controls 56 and the computing system 24 (e.g., via positioning software residing in the computing system 24). In some embodiments, guidance functionality is omitted. The network interface 26 comprises the cellular network interfaces 30 and wireless network interface 32 that each comprise hardware and software that respectively enables cellular/Internet and wireless (e.g., RF) connections among network devices via the networks 14-18 (FIG. 1). The network interface 26 enables ad hoc field network connectivity among machines 12 co-located within a given field, as well as persistent connectivity to an associated field network or multiple field networks. The network interface 26 may comprise MAC and PHY components (e.g., radio circuitry, including transceivers, antennas, etc.), as should be appreciated by one having ordinary skill in the art. As indicated above, functionality of the network interface 26 (or other components of the control system 22) may be integrated into the computing system 24 in some embodiments.

The computing system 24 is configured to receive and process the information from the network interface 26, the positioning system 28, and/or the user interface 58. For instance, the computing system 24 may receive input from the display screen 34, such as to enable intervention of machine operations or during planning stages by the operator (e.g., customizations for boundary identification or path determination strategies) or selection and/or input of options (e.g., through set-up sessions, or real-time pop-up windows), as well as to enter various operational parameters. In some embodiments, the computing system 24 may receive input from the machine controls 56 (e.g., such as to enable feedback as to the position or status of certain devices, such as a header height and/or width, and/or speed, direction of the machine 12, etc.). The computing system 24 is also configured to cause the transmission of information, such as operational parameters (and/or enable the reception of information) via the network interface 26 with other control systems 22. Note that one or more of the components depicted in FIG. 6A may be combined into a single component, or distributed among additional components in some embodiments.

Figure 6B:
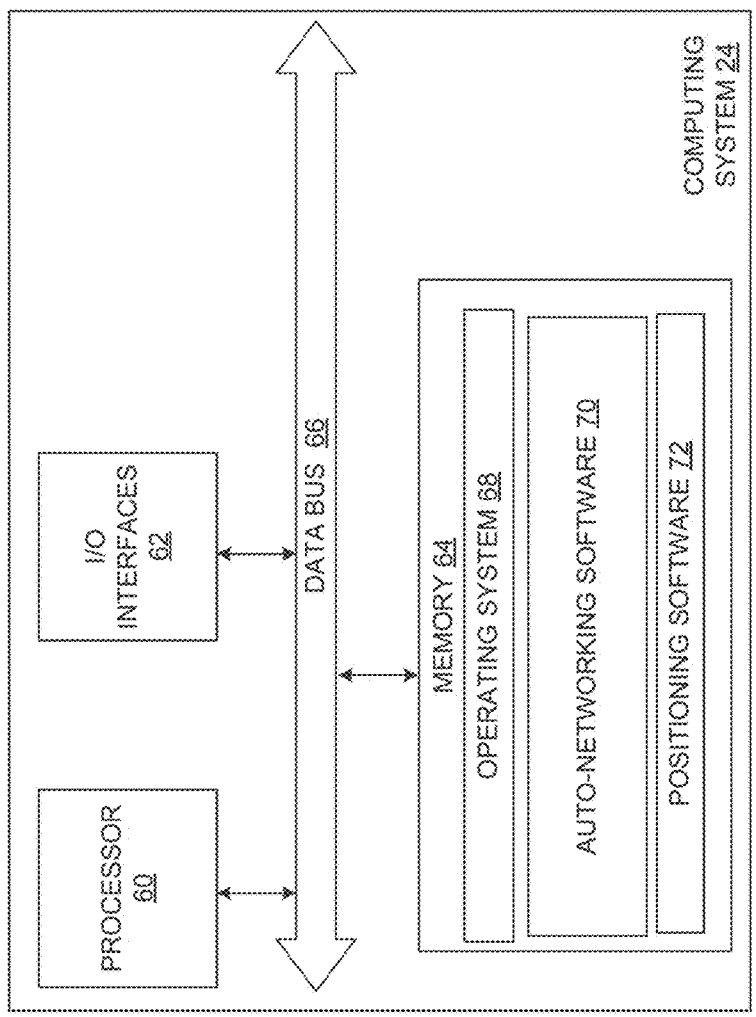
FIG. 6B is a block diagram that illustrates an embodiment of a computing system implemented in the control system of FIG. 6A.

With continued reference to FIG. 6A, FIG. 6B further illustrates an example embodiment of the computing system 24. One having ordinary skill in the art should appreciate in the context of the present disclosure that the example computing system 24 is merely illustrative, and that some embodiments of computing systems may comprise fewer or additional components, and/or some of the functionality associated with the various components depicted in FIG. 6B may be combined, or further distributed among additional modules, in some embodiments. It should be appreciated that, though described in the context of residing in the machine 12 (FIG. 1), in some embodiments, the computing system 24 or its corresponding functionality may be implemented in a computing device located outside of the field, such as in the server device 20 (FIG. 1). Referring to FIG. 6B, with continued reference to FIG. 6A, the computing system 24 is depicted in this example as a computer system, but may be embodied as a programmable logic controller (PLC), FPGA, ASIC, among other devices. It should be appreciated that certain well-known components of computer systems are omitted here to avoid obfuscating relevant features of the computing system 24. In one embodiment, the computing system 24 comprises one or more processors (also referred to herein as processor units or processing units), such as processor 60, input/output (I/O) interface(s) 62, and memory 64, all coupled to one or more data busses, such as data bus 66. The memory 64 may include any one or a combination of volatile memory elements (e.g., random-access memory RAM, such as DRAM, and SRAM, etc.) and nonvolatile memory elements (e.g., ROM, hard drive, tape, CDROM, etc.). The memory 64 may store a native operating system, one or more native applications, emulation systems, or emulated applications for any of a variety of operating systems and/or emulated hardware platforms, emulated operating systems, etc. In some embodiments, the memory 64 may store one or more field maps (e.g., aerial imagery of one or more fields), recorded entry points, identified boundaries of the one or more fields, paths previously determined, customizations, and other data pertinent to auto-networking implementations. In the embodiment depicted in FIG. 6B, the memory 64 comprises an operating system 68, auto-networking software 70, and positioning software 72. It should be appreciated that in some embodiments, additional or fewer software modules (e.g., combined functionality) may be employed in the memory 64 or additional memory. In some embodiments, a separate storage device may be coupled to the data bus 66, such as a persistent memory (e.g., optical, magnetic, and/or semiconductor memory and associated drives).

The auto-networking software 70 enables automatic (e.g., without the entry by an operator of passwords, IP addresses, etc.) association (e.g., connectivity) with a field network, including persistent connectivity (e.g., automatic, or in some embodiments, operator-configured) with a prior-established field network or multiple field networks. As previously described, the auto-networking software 70 may automatically configure equivalents to one or more wireless network login parameters, such as a respective user identification and/or password, to geographic features of a field to perform association with a given field. In some embodiments, the auto-networking software 70 may comprise one or more of functionality for automatic identification of field boundaries for one or more fields, detection of entry to a given field (e.g., past the identified boundaries) by the host machine 12 (FIG. 1), the recording of the entry points, selection of a field, the determination of a path (e.g., waylines, etc.) for farming the selected field, the detection of other machines that enter or reside within the field, and the redistribution of work or assignment of work among the machines 12 operating in, or operational within, the selected field. In some embodiments, operator control may be used in lieu of, or in combination with, automated or semi-automated control. The auto-networking software 70 also enables the communications and sharing of operational parameters among multiple machines 12 and/or the server device 20 (FIG. 1) via the network interface 26, and includes browser software, text and/or telephony software, among other software to achieve the disclosed functionality as should be appreciated by one having ordinary skill in the art.

The positioning software 72 may coordinate inputs from the positioning system 28 and output control signals to one or more machine controls 56 to enable real-time location detection, guided traversal, and/or performance of various farming operations on a field based on the shared operational parameters, among other information. In some embodiments, the functionality (e.g., code) of the auto-networking software 70 may be embodied in the positioning software 72, and in some embodiments, the functionality (e.g., code) of the positioning software 72 may be embodied in the auto-networking software 70.

Execution of the software modules 70 and 72 may be implemented by the processor 60 under the management and/or control of the operating system 68. In some embodiments, the operating system 68 may be omitted and a more rudimentary manner of control implemented. The processor 60 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 24 and/or the control system 22.

The I/O interfaces 62 provide one or more interfaces to the network 52 and other networks. In other words, the I/O interfaces 62 may comprise any number of interfaces for the input and output of signals (e.g., analog or digital data) for conveyance of information (e.g., data) over the network 52. The input may comprise input by an operator (local or remote) through the user interface 58 (e.g., a keyboard, joystick, steering wheel, or mouse or other input device (or audible input in some embodiments)), and input from signals carrying information from one or more of the components of the control system 22, such as the positioning system 28, machine controls 56, and/or the network interface 26, among other devices.

When certain embodiments of the computing system 24 are implemented at least in part as software (including firmware), as depicted in FIG. 6B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing system 24 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6C:
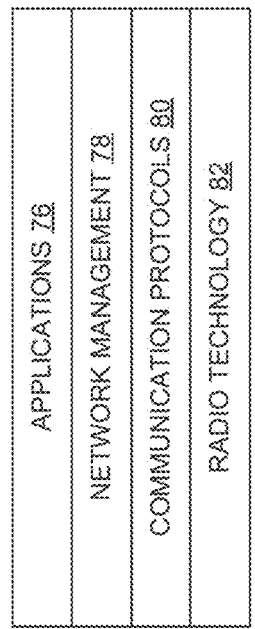
FIG. 6C is a block diagram of an example network stack representing the logical layers of the control system of FIG. 6A for enabling communications.

Referring to FIG. 6C, shown is an example network stack 74 representing the logical layers of the control system 22 (FIG. 6A). From higher to lower layers, shown in FIG. 6C is an applications layer 76, a network management layer 78, a communications protocol layer 80 (e.g., 802.11, etc.), and a radio technology layer 82 (e.g., physical layer). Though emphasis has been placed throughout the disclosure on the network management layer 78, it should be appreciated by one having ordinary skill in the art that each layer of the network stack 74 is implemented by the control system 22, with variations in the manner of each stack based on the given implementation. For instance, there are a number of radio technologies or protocols that may be used to link the machines to a given field network or networks (e.g., 802.11 communications protocols, Bluetooth protocols, RTP protocols, etc.), as would be understood by one having ordinary skill in the art, though emphasis is placed herein on the higher level layer of how to manage communications, and in particular, automatic connectivity to a given field network based on field boundaries and collaboration among control systems 22 of plural machines 12 (FIG. 1) and/or a server device 20 (FIG. 1) through the uniquely defined field networks. In the various embodiments described herein, each machine 12 that enters a field automatically connects to the associated field network of that field, enabling the sharing of information among machines of an automatically created group of networked machines according to a geofence without the manual rigors often associated with connecting to a wireless network (e.g., manual entry of passwords, usernames, IP addresses, etc.).

In view of the above description, it should be appreciated that one embodiment of an auto-networking method 84, depicted in FIG. 7, comprises entering, by machine, a first field defined by first field boundaries (86); and automatically associating the machine with a first wireless network defined by the first field boundaries, the first wireless network comprising a secured data communications network (88). For instance, the first wireless network comprises a geofence that enables co-located machines to exchange operational parameters and otherwise communicate with each other, while preventing machines outside of the geofence (and hence outside the network) from communicating with the first wireless network.

Any process descriptions or blocks in flow diagrams should be understood as representing steps and/or modules, segments, or portions of code which include one or more executable instructions for implementing specific logical functions or steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:
   entering, by machine, a first field defined by first field boundaries; and
   automatically associating the machine with a first wireless network defined by the first field boundaries, the first wireless network comprising a secured data communications network.

2. The method of claim 1, further comprising wirelessly broadcasting information responsive to the associating.

3. The method of claim 1, further comprising wirelessly receiving and processing information communicated over the first wireless network from one or more other machines located within the first field boundaries.

4. The method of claim 1, further comprising wirelessly receiving and ignoring second information communicated over a second wireless network that at least partially overlaps the first wireless network, the second information received from one or more other machines located outside the first field boundaries.

5. The method of claim 1, wherein access to information wirelessly transmitted from the first wireless network by the machine requires the machine to be present within the first field boundaries.

6. The method of claim 1, further comprising presenting a visual display of operational parameters corresponding to the machine located within the first field responsive to the entry.

7. The method of claim 1, further comprising presenting a visual display of operational parameters corresponding to the machine located within the first field as well as any other machine or machines located within the first field for which information is shared over the first wireless network.

8. The method of claim 1, further comprising automatically and wirelessly transmitting information to one or more identified machines located within the first field, each transmission comprising a unicast transmission.

9. The method of claim 1, further comprising maintaining a connection to the first wireless network upon the machine exiting the first field.

10. The method of claim 9, further comprising automatically associating the machine with a second wireless network defined by second field boundaries upon entering a second field defined by second field boundaries, the second wireless network comprising a secured data communications network.

11. The method of claim 1, further comprising wirelessly receiving and processing information communicated over the first wireless network from one or more other machines located outside first field boundaries when the one or other machines were previously located within the first field boundaries.

12. A system, comprising:
   a first machine, comprising:
   a chassis coupled to rotating elements to cause traversal across a field;
   a wireless network interface; and
   a computing system configured to—
      detect when the first machine enters a first field defined by first field boundaries; and automatically associate the first machine with a first wireless network defined by the first field boundaries responsive to the detection, the first wireless network comprising a secured data communications network.

13. The system of claim 12, further comprising a second machine, the second machine comprising:
a chassis coupled to rotating elements to cause traversal across a field;
a wireless network interface; and
a computing system configured to:
detect when the second machine enters the first field; and
automatically associate the second machine with the first wireless network responsive to the detection.

14. The system of claim 13, wherein responsive to the first and second machines entering the first field, the computing systems of the first and second machines, respectively, are configured to automatically share information over the first wireless network via the respective wireless network interfaces.

15. The system of claim 14, further comprising the computing systems of the first and second machines causing a visual display of all or a portion of the shared information.

16. The system of claim 14, wherein responsive to the first or second machine exiting the first field, the computing systems of the first or second machines, respectively, are configured to maintain a connection to the first wireless network via the respective wireless network interface.

* * * * *